Sept. 2, 1930. W. RASMUSSEN 1,774,902
CURTAIN OPERATING MECHANISM
Filed May 8, 1929
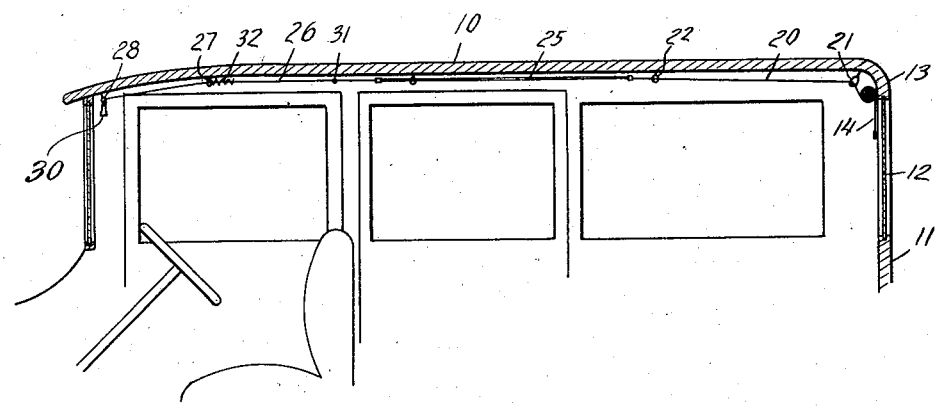
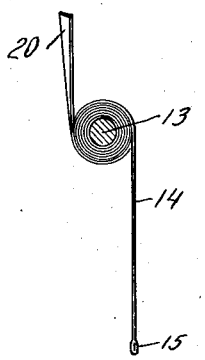 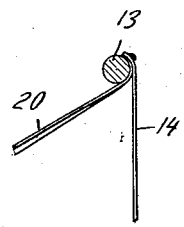
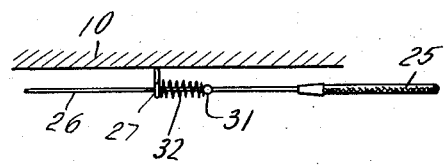
INVENTOR
Waldemar Rasmussen
BY
Marshall H Hawley.
ATTORNEYS Patented Sept. 2, 1930

1,774,902

UNITED STATES PATENT OFFICE

WALDEMAR RASMUSSEN, OF SOUTH NORWALK, CONNECTICUT

CURTAIN-OPERATING MECHANISM

Application filed May 8, 1929. Serial No. 361,279.

This invention relates to curtain operating mechanism for automobiles.

It often happens that the driver of a motor vehicle will desire to have the rear window shade or curtain drawn as, for instance, when the headlights of a car in the rear are reflected in the windshield. In order to accomplish this, the driver must request those in the rear of the car to draw the shade or, if no one is seated in the back of the car, he must stop the car and draw the shade himself. This is obviously inconvenient and time consuming.

This invention has for its salient object to provide a simple, practical and inexpensive mechanism for enabling the driver of a vehicle to lower or raise the window curtain or shade in the rear of the car without leaving his seat.

Another object of the invention is to provide a mechanism of the character described, so constructed and arranged that the shade can be drawn or raised by those in the rear of the car without interfering with the control thereof from the driver's seat.

Further objects of the invention will appear from the following specification taken in connection with the drawings, which form a part of this application, and in which Fig. 1 is a longitudinal sectional elevation of a portion of a motor vehicle showing curtain operating mechanism constructed in accordance with the invention;

Fig. 2 is an enlarged sectional elevation showing the means for rotating the shade roller;

Fig. 3 is a view similar to Fig. 2 but showing the operating strip and shade connections to the roller; and Fig. 4 is a detail sectional elevation showing resilient stop means for limiting the movement of the curtain control or operating element.

The invention briefly described consists of a motor vehicle of any suitable construction having a rear window, a shade roller for the window, and mechanism operatively connected to the shade roller for raising or lowering the shade and extending to a position adjacent the front of the vehicle or driver's seat whereby the shade can be raised or lowered by the vehicle operator. The operative connections are so constructed and arranged in the front of the vehicle that they are within easy reach of the driver but will be held in position at the top of the vehicle so as not to obstruct the view of the operator.

Further details of the invention will appear from the following description.

In the form of the invention illustrated in the drawings, there is shown a portion of the body of an automobile comprising a top 10 and a rear wall 11 having a window 12 therein. A conventional spring shade roller 13 is mounted in the usual position above the rear window and a shade or curtain 14 is secured to the roller and is adapted to be wound thereon and unwound therefrom. By grasping the lower end 15 of the shade, the shade can be raised and lowered in the usual manner.

In order to enable the operator in the front of the car to raise or lower the rear curtain or shade 14, operative connections are provided between the shade roller and the front of the vehicle. In the form of the invention shown, these connections consist of a strip 20, preferably of flat material, which is secured to the roller 15 and is wound on the roller with the shade 14. The strip 20 can be secured to the roller at any desired point and is preferably secured in such a position that the operating mechanism connected thereto will operate in a substantially straight line. The free end of the strip 20 is led through eyes or guide pulleys 21 and 22 and the end of the strip is secured to an elastic strip 25. The strip 25 is also led through suitable guiding means and is connected at its front end to a strip or cord 26 which extends through eyes 27 and 28, and has connected to the free end thereof a knob or handle 30. In order to limit the forward movement of the strip 26 and the parts carried thereby, a knot 31 is formed in the strip and is adapted to engage a resilient or spring stop 32 which is fixedly secured to the top of the vehicle. The spring 32 and knot 31 are so positioned that the cord or strip 26 and the parts connected thereto can be moved to a sufficient extent to lower the shade but will be prevented from any further movement in a forward direction. The elastic strip 25 is provided for the purpose of retaining the knob or handle 30 in elevated position, except when the handle and cord attached thereto are pulled down to lower the shade. In other words, the handle will be positioned at the top of the vehicle whether the shade is raised or lowered, thus preventing any obstruction in the view of the driver.

From the foregoing description it will be clear that simple, practical and inexpensive curtain operating means has been designed and that the use of such mechanism will enable the operator of a vehicle to raise or lower the rear curtain at will without requiring him to leave his seat or to stop the car.

Although one specific embodiment of the invention has been particularly shown and described, it will be understood that the invention is capable of modification and that changes in the construction and in the arrangement of the various cooperating parts may be made without departing from the spirit or scope of the invention, as expressed in the following claims.

What I claim is:

1. In a vehicle body having, a rear window, a shade roller above said window and a shade thereon, a strip secured to the roller and adapted to be wound thereon with said shade, operating means including an elastic take up member connected to said strip, and guiding means for said operating means for guiding said operating means to a position above the driver's seat.

2. In a vehicle body having, a window, a shade roller above the window, a shade on the roller, a strip on the roller and adapted to unwind and wind up with the shade, operating means including an elastic take up member connected to the strip for raising and lowering the shade, and guide means for guiding said operating means to a position adjacent the driver's seat.

3. In a vehicle body having, a window, a shade roller above the window, a shade on the roller, a strip on the roller and adapted to unwind and wind up with the shade, operating means including an elastic take up member connected to the strip for raising and lowering the shade, guide means for guiding said operating means to a position adjacent the driver's seat, and stop means for limiting the movement of the operating means in a direction to draw the shade.

4. In a vehicle body, having a window, a shade roller above the window, a shade on the roller, a strip on the roller and adapted to unwind and wind up with the shade, operating means including an elastic take up member connected to the strip for raising and lowering the shade, guide means for guiding said operating means to a position adjacent the driver's seat, and resilient stop means for limiting the movement of the operating means in a direction to draw the shade.

5. In a vehicle body having a rear window, a shade roller above said window having a shade thereon, a strip secured to the roller and positioned to be wound thereon within the convolutions of the shade, operating means connected to said strip and located to move said strip along a line substantially at right angles to the normal line of movement of the shade, a handle connected to said operating means, and an elastic take up effective to position said handle in the same location regardless of the position of the shade.

WALDEMAR RASMUSSEN.